US010457789B2

(12) United States Patent
Zhao et al.

(10) Patent No.: US 10,457,789 B2
(45) Date of Patent: Oct. 29, 2019

(54) EXTRUSION OF POLYPROPYLENES WITH ORGANIC PEROXIDES

(71) Applicant: ExxonMobil Chemical Patents Inc., Baytown, TX (US)

(72) Inventors: Mosha H. Zhao, Houston, TX (US); George J. Pehlert, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 15/559,130

(22) PCT Filed: Feb. 17, 2016

(86) PCT No.: PCT/US2016/018272
§ 371 (c)(1),
(2) Date: Sep. 18, 2017

(87) PCT Pub. No.: WO2016/164111
PCT Pub. Date: Oct. 13, 2016

(65) Prior Publication Data
US 2018/0244883 A1 Aug. 30, 2018

Related U.S. Application Data

(60) Provisional application No. 62/145,575, filed on Apr. 10, 2015.

(51) Int. Cl.
*C08K 5/14* (2006.01)
*C08J 9/00* (2006.01)
(Continued)

(52) U.S. Cl.
CPC ............ *C08J 9/0023* (2013.01); *C08J 3/203* (2013.01); *C08J 9/0014* (2013.01); *C08J 9/0038* (2013.01);
(Continued)

(58) Field of Classification Search
CPC ...... C08J 9/0023; C08J 3/203; C08J 2201/03; C08J 2323/12; C08K 5/14
See application file for complete search history.

(56) References Cited

U.S. PATENT DOCUMENTS 4,897,452 A    1/1990  Berrier et al.
5,047,485 A    9/1991  DeNicola, Jr.
(Continued)

FOREIGN PATENT DOCUMENTS

EP    2000504 A    10/2008
EP    1159309 B    2/2009
(Continued)

OTHER PUBLICATIONS

Lagendijk, R.P.; Hogt, A.H.; Buijtenhuijs, A.; Gotsis, A.D. "Peroxydicarbonate modification of polypropylene and extensional flow properties" Polymer 2001, 42, pp. 10035-10043. (Year: 2001).*
(Continued)

*Primary Examiner* — Kara B Boyle
*Assistant Examiner* — Christina H. W. Rosebach
(74) *Attorney, Agent, or Firm* — Kevin M. Faulkner

(57) ABSTRACT

A process to form a polypropylene composition comprising combining at a temperature within a range from 190° C. to 320° C. a polypropylene resin and within the range from 0.01 wt % to 3 wt % of at least one organic peroxide, by weight of the polypropylene composition and within a range from 100 to 4000 ppm each of phosphorous- and hindered phenol antioxidants; the polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C. The resulting polypropylene composition comprises at least 50 mol % propylene and has a peak extensional viscosity of
(Continued)

greater than 500 kPa·s at a strain rate of 0.01 sec⁻¹ (190° C.) and a melt strength of at least 40 determined using an extensional rheometer at 190°.

25 Claims, 5 Drawing Sheets

(51) Int. Cl.
    *C08K 5/098*     (2006.01)
    *C08K 5/526*     (2006.01)
    *C08J 9/06*     (2006.01)
    *C08J 3/20*     (2006.01)

(52) U.S. Cl.
CPC .......... *C08J 9/06* (2013.01); *C08K 5/098* (2013.01); *C08K 5/14* (2013.01); *C08K 5/526* (2013.01); *C08J 2201/026* (2013.01); *C08J 2201/03* (2013.01); *C08J 2323/10* (2013.01); *C08J 2323/12* (2013.01)

(56) References Cited

U.S. PATENT DOCUMENTS

| | | | |
|---|---|---|---|
| 5,180,751 A | | 1/1993 | Park et al. |
| 5,416,169 A | | 5/1995 | Saito et al. |
| 5,883,151 A | | 3/1999 | Raetzsch et al. |
| 6,103,833 A | | 8/2000 | Hogt et al. |
| 6,323,289 B1 | * | 11/2001 | Hogt .......... C08K 5/14 525/387 |
| 6,350,828 B1 | * | 2/2002 | Takaoka .......... C08L 23/10 525/240 |
| 6,573,343 B1 | | 6/2003 | Follestad |
| 6,875,826 B1 | | 4/2005 | Huovinen et al. |
| 6,956,067 B2 | | 10/2005 | Sasaki et al. |
| 8,153,745 B2 | | 4/2012 | Ernst et al. |
| 9,068,030 B2 | | 6/2015 | Song et al. |
| 9,200,095 B2 | | 12/2015 | Tran et al. |
| 9,464,178 B2 | * | 10/2016 | Abubakar .......... C08K 3/01 |
| 9,902,822 B2 | * | 2/2018 | Abubakar .......... C08J 5/18 |
| 2002/0043643 A1 | | 4/2002 | Korehisa et al. |
| 2003/0119996 A1 | | 6/2003 | Kitano et al. |
| 2003/0157286 A1 | | 8/2003 | Hesse et al. |
| 2009/0264567 A1 | | 10/2009 | Prins et al. |
| 2010/0222470 A1 | | 9/2010 | Basfar et al. |
| 2012/0245302 A1 | | 9/2012 | Nakajima et al. |
| 2013/0032963 A1 | | 2/2013 | Tokiwa et al. |
| 2015/0018463 A1 | * | 1/2015 | Chikhalikar .......... C08F 8/00 524/126 |
| 2015/0284521 A1 | * | 10/2015 | Abubakar .......... C08J 5/18 428/220 |
| 2015/0291755 A1 | * | 10/2015 | Abubakar .......... C08K 3/01 521/143 |
| 2017/0066894 A1 | * | 3/2017 | Williams .......... C08J 9/06 |

FOREIGN PATENT DOCUMENTS

| | | |
|---|---|---|
| EP | 2433982 A | 3/2012 |
| EP | 2679630 A | 1/2014 |
| JP | 2010043162 A | 2/2010 |
| KR | 20040085637 A | 10/2004 |
| WO | 1994/005707 A | 3/1994 |
| WO | 1997/49759 A | 12/1997 |
| WO | 1999/27007 A | 6/1999 |
| WO | 2012/049690 A | 4/2012 |
| WO | 2012/173873 A | 12/2012 |
| WO | 2013/032552 A | 3/2013 |
| WO | 2014/070384 A | 5/2014 |
| WO | 2014/070386 A | 5/2014 |
| WO | 2015/200586 A | 12/2015 |
| WO | 2016/126429 A | 8/2016 |
| WO | 2016/126430 A | 8/2016 |

OTHER PUBLICATIONS

Iacobucci, P., "High Melt Strength Polypropylene Through Reactive Extrusion with Perkadox 24L", SPE, Polyolefins Conference, Houston, TX Feb. 2014.

Lagendijk, R. P. et al. "Peroxydicarbonate modification of polypropylene and extensional flow properties", Polymer, vol. 42, No. 25, pp. 10035-10043, 2001.

Gotsis, A.D. et al. "Effect of long branches on the rheology of polypropylene", Journal of Rheology, vol. 48, No. 4, pp. 895-914, 2004.

Wagner, M. H., et al. "The strain-hardening behavior of linear and long-chain-branched polyolefin melts in extensioal flows", Rheol Acta, vol. 39, pp. 97-109, 2000.

Spitael P., et al. "Strain hardening in polypropylenes and its role in extrusion foaming",Polymer Engineering and Science, vol. 44, No. 11, pp. 2090-2100, 2004.

Ratzsch M., et al. "Radical reactions on polypropylene inthe solid state", Progress in Polymer Science, vol. 27, pp. 1195-1282, 2002.

"Spisakova N., et al. Partial crosslinking of the heterophasic ethylene-propylene copolymer in the solid phase", Journal of Macromolecular Science, Part A, vol. 37, pp. 15-35, 2000.

Jayaraman K. et al. "Entangling additives enhance polypropylene foam quality", Society of Plastics Engineers Plastics Research Online, 2011.

Pol. H. et al. "Microstructure and rheology of high-melt-strength poly-(propylene) impact copolymer", Society of Plastics Engineers Plastics Research Online, pp. 1-3. 2004.

"Polymer Properties Database" (URL:http://polymerdatabase.com/polymer%/020chemistry/t-half2.html).

Bacci, D. et al. "Peroxide Crosslinking of Ziegler-Natta Thermoplastic Polyolefins", Polymer Engineering and Science, vol. 44, No. 1, pp. 131-140, 2004.

Maier, C., et al., "Polypropylene—The Definitive User's Guide and Databook" William Andrew Publishing/Plastics Design Library, Norwich NY, pp. 27-29, 1998.

* cited by examiner

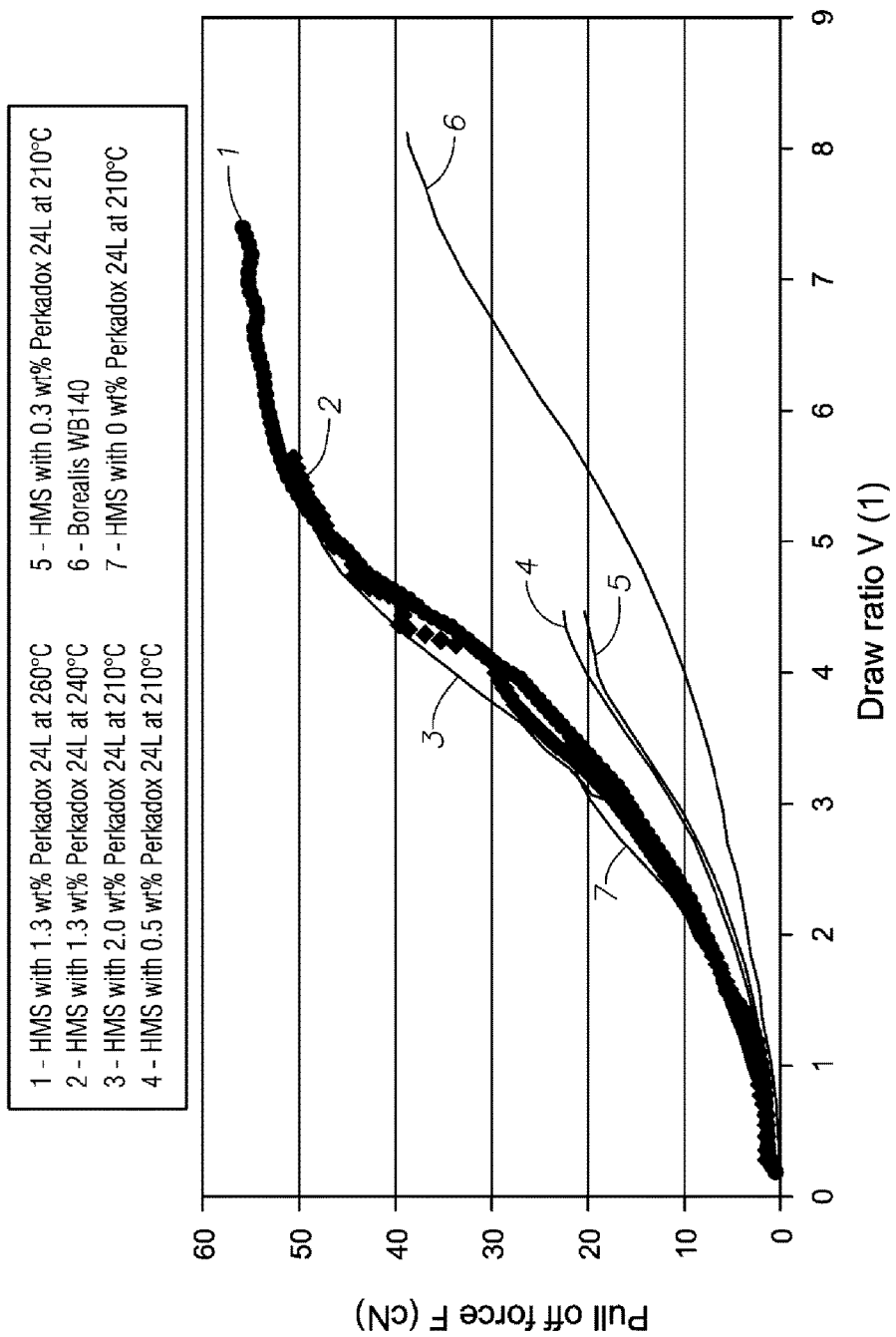

EXTRUSION OF POLYPROPYLENES WITH ORGANIC PEROXIDES

CROSS-REFERENCE TO RELATED APPLICATION

The present application is a National Phase Application claiming priority to PCT Application Serial No. PCT/US2016/018272 filed Feb. 17, 2016, and claims priority to U.S. Ser. No. 62/145,575, filed Apr. 10, 2015, which are incorporated herein by reference.

BACKGROUND

Market demand for low cost, low environmental impact, and safe microwavable containers for use in food and other packaging applications represents an opportunity for polypropylene ("PP") to replace polystyrene. However, common linear polypropylene grades display low melt strength and lack strain hardening behavior needed for foams. A polypropylene resin (see WO 2014/070386) with broad molecular weight distribution has shown some promise in terms of improved melt strength, but its strain hardening could be improved. To expand the applications of high melt strength polypropylene resins the inventors have worked towards developing a new polypropylene product with high melt strength and strain hardening through a reactive extrusion process that is compatible with common production technologies. Part of such work involves development of the melt extrusion process, especially reactive extrusion of polypropylenes with organic peroxides and ways to improve such processes. Thus, there is a need for an improved melt extrusion process to form high melt strength and strain hardened polypropylene. The inventors have surprisingly found that the higher processing temperatures impart favorable properties to the polypropylene.

Other relevant publications include EP 2 720 954 A1; EP 2 751 194 A1; EP 2 679 630 A1; EP 2 000 504 A1; EP 1 159 309 B1; U.S. Pat. Nos. 5,180,751; 5,883,151; 6,323,289; 6,573,343; 6,875,826; US 2003/0157286; WO 1997/49759; WO 1999/27007; WO 1994/005707; WO 2012/049690; and WO 2014/070386; and

- N. Spisakova et al., in 15 J. MACRM. SCI. & APP. CHEM. 37 (2000);
- M. H. Wagner et al., "The strain-hardening behaviour of linear and long-chain-branched polyolefin melts in extensional flows," in 39 RHEOL. ACTA 97-109 (2000);
- R. P. Lagendijk et al., in "Peroxydicarbonate modification of polypropylene and extensional flow properties," in 42 POLYMER 10035-10043 (2001);
- M. Ratzsch et al., 27 PROG. POLYM. SCI. 27 1195 (2002);
- A. D. Gotsis, "Effect of long branches on the rheology of polypropylene," in 48(4) J. RHEOLOGY 895-914 (2004);
- P. Iacobucci, "High melt strength polypropylene through reactive extrusion with Perkadox 24L," SPE POLYOLEFINS CONFERENCE, Houston, Tex. (February 2004);
- P. Spitael et al., in "Strain hardening in polypropylenes and its role in extrusion foaming," in 44(11) POLY. ENG. & SCI. 2090-2100 (2004);
- K. Jayaraman et al., "Entangling additives enhance polypropylene foam quality," in SPE PLASTICS RESEARCH ONLINE (2011); and
- H. Pol et al., "Microstructure and rheology of high-melt-strength poly-(propylene) impact copolymer," in SPE PLASTICS RESEARCH ONLINE (2014).

SUMMARY

Disclosed is a process to form a polypropylene composition comprising combining at a temperature within a range from 190° C. to 320° C. a polypropylene resin and within the range from 0.01 wt % to 3 wt % of at least one organic peroxide, by weight of the ingredients, and within a range from 100 to 4000 ppm each of phosphorous- and hindered phenol antioxidants, and isolating a polypropylene composition; the polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.

Also disclosed is a process to form a polypropylene composition comprising combining at a temperature within a range from 190° C. to 320° C. a polypropylene resin and within the range from 0.01 wt % to 3 wt % of at least one organic peroxide, by weight of the ingredients, and within a range from 100 to 4000 ppm each of phosphorous- and hindered phenol antioxidants, and isolating a polypropylene composition; the polypropylene resin having a melt strength within the range from 10 to 40 cN, and the polypropylene composition having a melt strength within the range from greater than 40 to 100 cN, both as determined using an extensional rheometer at 190° C.

Also disclosed is a polypropylene composition comprising at least 50 mol % propylene and having a PEV (annealed) of greater than 500 kPa·s at a strain rate of 0.01 sec$^{-1}$ (190° C.) and a melt strength of at least 40 determined using an extensional rheometer at 190° C.

BRIEF DESCRIPTION OF THE DRAWINGS

FIG. 5 is a graph of Pull-off-Force as a function of draw ratio for various polypropylene resins and reaction products at various temperatures.

DETAILED DESCRIPTION

Figure 1:
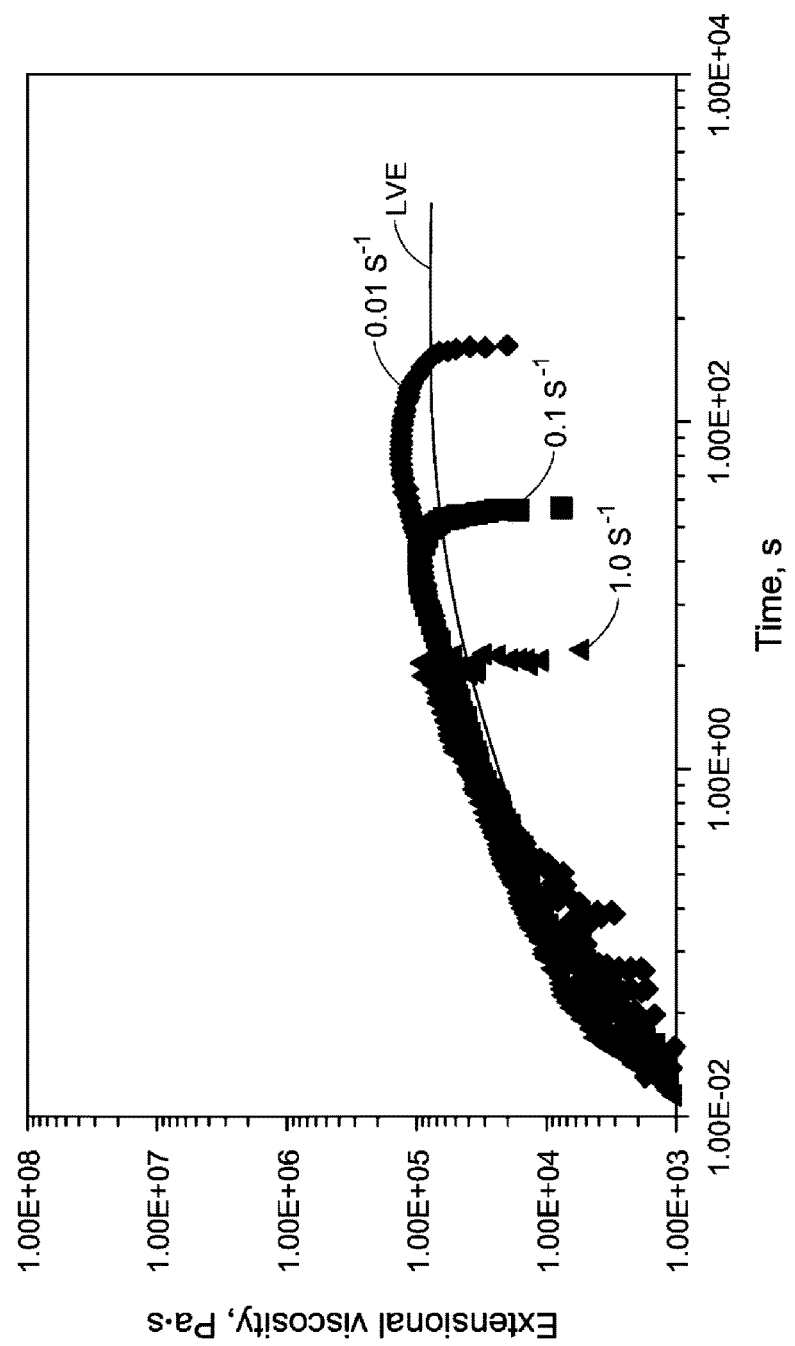
FIG. 1 is a graph of Extensional Viscosity data as a function of time using the MCR501 Dynamic Stress/Strain Rheometer as described below for polypropylene resin at 240° C.

Disclosed here is a process to form a polypropylene composition having improved sheer thinning and melt strength, making it highly suitable for application such as making foamed articles at commercial conditions (e.g., relatively high extrusion temperatures). The inventors have unexpectedly found that the sheer viscosity of the reaction product of short half-life organic peroxides with certain polypropylenes, such as reaction during melt extrusion, can be effected by increasing reaction (e.g., melt extrusion) temperature. A higher reaction temperature between at least the organic peroxide and polypropylene will further improve sheer viscosity over the same reaction product when combined at lower temperatures (e.g., 210° C. versus 260° C.), thus leading to a new method of improving sheer viscosity in polypropylenes, and the higher sheer viscosity product therefrom.

As evidenced by a number of factors such as (1) an increasing $I_{21}/I_2$ value of the reaction product polypropylene composition (or simply "polypropylene composition") indicating improved sheer thinning, (2) the high draw ratios evidencing extensional flow capabilities, and (3) increased extensional viscosity as directly measured and quantified in the Peak Extensional Viscosity ("PEV") values, the inventors disclose in any embodiment a polypropylene composition comprising the reaction product at a temperature within the range from 190, or 200, or 220° C. to 270, or 280, or 290, or 300, or 320° C. of a polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and within the range from 0.01 to 3 wt % of at least one organic peroxide (or other quantities as described herein), by weight of the polypropylene composition.

The polypropylene composition described herein has several measurable features. In any embodiment, the polypropylene composition has an $Mz_{MALLS}/Mw_{MALLS}$ value of greater than 3.0, or 3.2, or 3.6, or within a range from 3.0, or 3.2, or 3.6 to 5.0, or 6.0, or 8.0, or 12, or 16. Also in any embodiment, the polypropylene composition has an MWD ($Mw_{MALLS}/Mn$) within the range from 10, or 12 to 16, or 20. Also in any embodiment, the polypropylene composition has a branching index (g') of less than 0.97, or 0.95, or 0.90, or within a range from 0.70, or 0.80 to 0.90, or 0.95, or 0.97, indicative of some branching and/or cross-linking of the polypropylene resin in the polypropylene composition.

The polypropylene composition has improved melt strength and extensional viscosity when compared to the polypropylene resins. In any embodiment the polypropylene composition has a melt strength greater than 40, or 45, or 50 cN, or within the range from 40, or 45, or 50, or 55 cN to 80, or 85, or 90, or 100 cN. In any embodiment, the polypropylene composition has a draw ratio of greater than 5, or 6, or within a range from 5, or 5.5 to 8, or 10, or 12. In any embodiment, the polypropylene composition has a PEV (annealed) of greater than 500, or 800, or 1000, or 1500, or 2000, or 2200, or 2400, or 2800, or 3000 kPa·s at a strain rate of 0.01 sec$^{-1}$ (190° C.), or within a range of from 500, or 800, or 1000, or 1500, or 2000 kPa·s to 5000, or 5500, or 6000, or 6500, or 7000, or 8000 kPa·s. The PEV is the difference between the highest value for the extensional viscosity and the LVE, as labeled in FIG. 3.

As further evidence of any long chain branching and/or cross-linking in the organic peroxide-treated polypropylene resins, the melt flow properties were measured. In any embodiment the polypropylene composition has an $I_{21}/I_2$ value (ASTM D1238, 21.6 kg/2.16 kg, 190° C.) of greater than 150, or 160, or 170, or within a range from 160, or 170 to 190, or 200, or 220, or 240, or 260. The I2 value of the polypropylene composition in any embodiment is within a range from 0.1, or 0.2, or 0.5 g/10 min to 4, or 5, or 8, or 10 g/10 min.

The polypropylene composition can thus be described by any combination of features described herein. For instance, in any embodiment is disclosed a polypropylene composition comprising at least 50 mol % propylene-derived units ("propylene") and having a PEV (annealed) of greater than 500 kPa·s at a strain rate of 0.01 sec$^{-1}$ (190° C.) and a melt strength of at least 40 determined using an extensional rheometer at 190° C.

The individual components used to form the polypropylene composition is described in more detail here, elements of which can be easily interchanged with the description above.

Polypropylene Resin

As stated above, the polypropylene composition is derived from a polypropylene having a balanced melt strength (greater than 10 or 20 cN), referred herein simply as a "polypropylene resin" having certain desirable features. Some desirable features and its method of production are described in WO 2014/070386. In particular, in any embodiment the polypropylene resin useful in the present disclosure comprises at least 50, or 60, or 70, or 80, or 90 mol % propylene, or within a range from 50, or 60, or 80 to 95, or 99 mol % propylene-derived units. In any embodiment the polypropylene resin is a homopolymer of propylene-derived units. In any embodiment the polypropylene resin may comprise within the range from 0.1 to 10 mol % of a comonomer selected from the group consisting of ethylene and $C_4$ to $C_{20}$ olefins.

In any embodiment the polypropylene resin has an isopentad percentage of greater than 90, or 92, or 95%. Also in any embodiment the polypropylene resin has a melt flow rate (MFR) within the range from 0.1, or 1, or 2 g/10 min to 12, or 16, or 20, or 40 g/10 min, determined according to ASTM D1238 Condition L (230° C./2.16 kg).

In any embodiment the polypropylene resin has a molecular weight distribution (Mw/Mn) greater than 6, or 8, or 10, or within a range from 6, or 7, or 8 to 14, or 16, or 18 or 20. Also in any embodiment the polypropylene resin has an Mz/Mw value of less than or equal to 3.6, or 3.4, or 3.2, or 3.0. The polypropylene resins useful in the present disclosure tend to be highly linear as evidenced by a high branching index. Thus, in any embodiment the polypropylene resins have a branching index (g', also referred to in the literature as $g'_{vis\ avg}$) of at least 0.97, or 0.98. In any embodiment the polypropylene resins useful herein have a melt strength greater than 10, or 20, or 30 cN determined using an extensional rheometer at 190° C., or within a range from 10, or 15, or 18 cN to 35, or 40 cN.

In any embodiment the polypropylene resins have a viscosity ratio within the range from 35 to 80 determined from the complex viscosity ratio at 0.01 to 100 rad/s angular frequency at a fixed strain of 10% at 190° C. Also in any embodiment the polypropylene resin has a PEV (annealed) within a range from 10, or 20 kPa·s to 40, or 50, or 55, or 60 kPa·s at a strain rate of 0.01/sec (190° C.).

In any embodiment the polypropylene resin has a heat distortion temperature of greater than or equal to 100° C., determined according to ASTM D648 using a load of 0.45 MPa (66 psi). Finally, in any embodiment the polypropylene resin has a Modulus within the range from 1800, or 2000 MPa to 2400, or 2500 MPa determined according to ASTM D790A on nucleated samples with 0.1% α-nucleating agent.

The polypropylene resin can be used in any embodiment, such as by combining with other ingredients, in the form of reactor granules and/or flakes, or as extruder-formed pellets.

Organic Peroxides and Methods of Forming the Polypropylene Composition

In any embodiment, the polypropylene composition is formed by combining under suitable conditions the polypropylene resin, phosphorous- and hindered phenol antioxidants, and an organic peroxide, wherein the "organic peroxide" is any organic compound comprising at least one —(O)COO— group and/or at least one —O—O— group, and a 1 hour half-life temperature ($^1T_{1/2}$) of less than 100° C. determined in an aromatic and/or halogenated aromatic hydrocarbon solvent, preferably a ($^1T_{1/2}$) within the range from 25, or 35, or 45° C. to 65, or 75, or 85, or 100° C.

In any embodiment, reactor granules of the polypropylene resin used herein are preferred over extruded pellets. Such polypropylene resin granules are preferably dry blended with the organic peroxide before melt extrusion. In any embodiment, the organic peroxide melts (becomes liquid) before combining with the polypropylene resin so that the granules get evenly coated and the high specific surface area is utilized prior to the branching and/or cross-linking reactions.

In any embodiment, the organic peroxide is selected from compounds having one or more structures selected from:

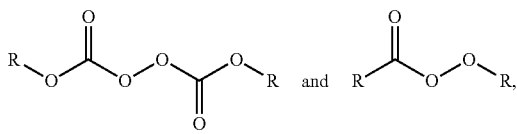

wherein each "R" group is independently selected from the group consisting of hydrogen, C1 or C5 to C24 or C30 linear alkyls, C1 or C5 to C24 or C30 secondary alkyls, C1 or C5 to C24 or C30 tertiary alkyls, C7 to C34 alkylaryls, C7 to C34 arylalkyls, and substituted versions thereof. By "substituted" what is meant are hydrocarbon "R" groups having substituents such as halogens, carboxylates, hydroxyl groups, amines, mercaptans, and phosphorous containing groups. In a particular embodiment, each "R" group is independently selected from C8 to C20 or C24 linear, secondary, or tertiary alkyls, such as octyl, decyl, lauryl, myristyl, cetyl, arachidyl, behenyl, erucyl and ceryl groups and linear, secondary or tertiary versions thereof.

In any embodiment, the polypropylene resin may be dry blended (or, if the organic peroxide is a liquid, dry-liquid blended) with at least the organic peroxide prior to melt extrusion, and more preferably during such dry blending may be heated up to below its melting point temperature prior to melt extrusion ("combining") with the organic peroxide, for instance, to a temperature within a range from 100, or 110, or 120° C. up to the melting point temperature such as 150, or 155, or 160° C.

The formation of the polypropylene composition described herein is effected in any embodiment by "combining" (melt blending, reactive extrusion, or melt extrusion) at least the polypropylene resin and organic peroxide such that they are caused to react with one another through shear forces and applied radiative heating during blending/extrusion in an apparatus such as a single or twin barrel extruder, to a melt temperature of at least the melting point of the polypropylene resin, such as at least 140, or 150, or 160, or 180° C., or within a range from 150, or 160° C. to 180, or 200, or 220, or 240, or 260, or 280, or 300, or 320° C. In any embodiment the polypropylene composition, directly from the extrusion process, is formed into reactor flakes and/or granules, or extruded pellets without being treated under vacuum and/or solvent washing.

Thus formed, the polypropylene composition described herein is ready to ship, transport, and/or store without further treatment, and be used in making any number of articles, both foamed and non-foamed. In any embodiment a foaming agent may be added during the heating/extrusion process described above such that the agent is not activated until after shipping and ready to form into a foamed article. As mentioned, the composition may be later heated/extruded again to form articles and effect foaming, if so desired.

Thus described herein is a process to improve sheer thinning and melt strength in a polypropylene composition comprising combining at a temperature, preferably, increasing temperatures, within the range from 190° C. to 320° C. a polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and within the range from 0.01 wt % to 3 wt % of at least one organic peroxide, by weight of the polypropylene composition. By the phrase "combining at increasing temperatures within a range from 190° C. to 320° C." what is meant is that the properties of the claimed polypropylene composition can be further improved by incrementally increasing, by any incremental amount, the temperature above the claimed level, such as above 190, or 200, or 210, or 220, or 240° C., up to 260, or 280, or 300, or 320° C. The "temperature" referred to here is the temperature of the polymer melt along with the other ingredients.

The process described herein is a means by which the extensional viscosity, or sheer thinning, of the polypropylene composition can be improved (increased). This is evidenced by direct measurements of extensional viscosity, and indirectly by measuring melt flow properties. For instance, in any embodiment, as the melt temperature of the polypropylene composition—preferably at the final or die stage of the extrusion process-increases from 190, or 210, or 240° C., the $I_{21}/I_2$ value of the polypropylene composition increases. For instance, when combined at 200-220° C., the $I_{21}/I_2$ of the polypropylene composition in any embodiment is within a range from 100 to 140, and when combined at a temperature of 260-280° C. the $I_{21}/I_2$ is within a range from 140 to 200.

In any embodiment, as the level of organic peroxide increases, the I2 and I21 values of the polypropylene composition decrease and the $I_{21}/I_2$ value increases; preferably as the level of organic peroxide increases above 1.5 wt % the $I_{21}/I_2$ value becomes constant or goes down. By "constant" what is meant is that the value of the $I_{21}/I_2$ does not vary more than by ±5, or ±10, or ±15%. Stated another way, the level of peroxide can be adjusted such that the optimal or peak value of $I_{21}/I_2$ is when the amount of organic peroxide combined when forming the polypropylene composition is within a range from 1.0, or 1.1 wt % to or 1.6, or 1.8, or 2.0 wt %. Thus, in any embodiment of the process of forming the polypropylene composition, a preferred level of organic peroxide is within a range from 1.0, or 1.1 wt % to or 1.6, or 1.8, or 2.0 wt % by weight of the polypropylene composition.

In any embodiment, the extensional viscosity of a polypropylene resin can be increased by melt extrusion of the polypropylene resin with at least one organic peroxide and increasing temperatures, preferably up to 260, or 280, or 300, or 320° C. In any embodiment, the PEV of the polypropylene resin can be increased by extruding with an organic peroxide as described to a value of greater than 500, or 800, or 1000, or 1500, or 2000, or 2200, or 2400, or 2800, or 3000 kPa·s at a strain rate of 0.01 sec$^{-1}$ (190° C.), or within a range of from 500, or 800, or 1000, or 1500, or 2000 kPa·s to 5000, or 5500, or 6000, or 6500, or 7000, or 8000 kPa·s by either or both of increasing the level of organic peroxide combined with the polypropylene resin and/or the temperature at which they are combined. For instance, when combined at 200-220° C., the PEV of the polypropylene composition in any embodiment is within a range from 500 to 1500 kPa·s, and when combined at a temperature of 260-280° C. the PEV is within a range from 1500 to 2500 kPa·s, as measured at a strain rate of 0.01 sec$^{-1}$ (190° C.).

In any embodiment, other "additives" may also be present in the polypropylene composition as is known in the art, up to 1, or 2, or 3 wt % by weight of the polypropylene composition. These additives may be added before, during, or after the formation of the reaction products of the organic peroxide and polypropylene resins. Such additives include antioxidants (e.g., hindered phenol- and phosphorous-type compounds), nucleators, colorants (dyes, pigments, etc.), fillers (silica, talc, etc.), UV stabilizers, release agents, tackifiers, anti-static agents, acid scavengers (e.g., calcium stearate), anti-blocking agents, anti-blooming agents, alkyl-radical scavengers such as disclosed in WO 2015/200586, and other common additives as is known in the art. In a preferred embodiment, even when the polypropylene composition "consist of" the named components, the composition may nonetheless include within a range from 100 to 4000 ppm each of phosphorous- and hindered phenol antioxidants, or within a range from 100 to 4000 ppm of each of antioxidants (one or more) and foaming agents (one or more), or other amount as disclosed herein.

The polypropylene resin in any embodiment is preferably blended with hindered phenol and phosphorous-type antioxidants, and optionally at least one alkyl radical scavenger prior to or simultaneous with melt extrusion. "Hindered phenol" and "phosphorous-type" antioxidants ("primary" and "secondary" antioxidants) are well documented in the art, such as in Stricker et al. "New Stabilizer solutions for polyolefin film grades", in European TAPPI PLACE Conference, Rome, Italy, May 12-14 (2003) (Ciba Specialty Chemicals); EP 1 736 506 A1; US 2005/0043450; and US 2006/0128849. Desirably, the polypropylene resin described herein is blended with at least one hindered phenol and at least one phosphorous-type antioxidant, and most preferably, with an alkyl radical scavenger as well.

More particularly, hindered phenol antioxidants, or "primary" antioxidants, comprise in any embodiment compounds having the structure HO-Ph-R, wherein "Ph" is a phenyl group which may or may not be substituted with alkyl groups, and "R" can be any alkyl, ketone, or carboxylate containing group. A particularly preferred structure in any embodiment for the hindered phenol antioxidant is selected from:

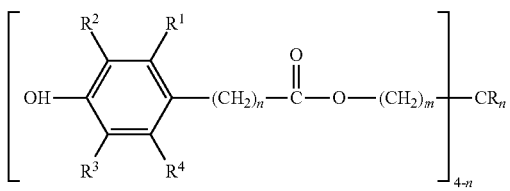

wherein each $R^1$ to $R^4$ is independently selected from hydrogens and $C_1$ to $C_{12}$ alkyls, more preferably, hydrogen and $C_4$ to $C_{10}$ alkyls, and most preferably hydrogen and $C_3$ to $C_8$ secondary or tertiary alkyls; and "n" is 0, 1, 2, or 3; n and m independently range from 1 to 5, or 10; and R is as defined for $R^1$. An example of such a phosphorous-type antioxidant is Irganox™ 1010 from BASF.

More particularly, phosphorous-type antioxidants, or "secondary" antioxidants, comprise in any embodiment compounds having the structure $P(OR)_3$, wherein each R is independently selected from hydrocarbyl groups, more particularly, a $C_5$ to $C_{20}$ alkyls, aryls, alkylaryls, and arylalkyls. A particularly preferred structure in any embodiment for the phosphorous-type antioxidant is selected from:

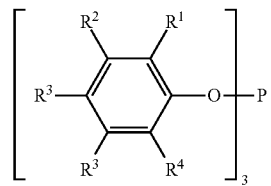

wherein each $R^1$ to $R^5$ is independently selected from hydrogens and $C_1$ to $C_{12}$ alkyls, more preferably, hydrogen and $C_4$ to $C_{10}$ alkyls, and most preferably hydrogen and $C_3$ to $C_8$ secondary or tertiary alkyls. An example of such a phosphorous-type antioxidant is Irgofos™ 168 from Ciba, Inc. or BASF.

Preferably, these primary and secondary antioxidants are independently present in the polypropylene resin, or blend used in the process disclosed herein, within a range from 100, or 500 or 600 or 700 or 800 ppm to 1000 or 1200 or 1600 or 2000 or 2500 or 3000 or 4000 ppm relative to the total weight of the components. Optionally, from 20 to 600, or 800, or 1000 ppm of an acid scavenger (such as alkali or alkaline metal stearates, and others known in the art sold by trade name) is also combined during melt extrusion.

In any embodiment, the polypropylene composition described herein comprises within a range from 100 to 4000 ppm each of phosphorous- and hindered phenol antioxidants and the reaction products thereof. The "reaction product thereof" recognizes that one or both of the antioxidants may react with oxygenate or other radical species during melt extrusion.

In any embodiment, so called "comonomers" such as C4 to C20 α-olefins, diolefins, and conjugated dienes such as butadiene or butadiene oligomers, isoprene, etc., and α-ω-linear dienes such as 1,9-decadiene are substantially absent from the polypropylene resin and/or the polypropylene composition described herein, meaning that if the comonomers are present at all, they are present to a level of less than 1 wt %, 0.1 wt %, or 0.01 wt % of the resin or composition, and are preferably not added to a reactor and/or extruder during any stage of the process.

The polypropylene composition has certain desirable features that make processing into pellets and/or articles of manufacture ideal. In any embodiment, a step of exposing the polypropylene composition to external radiation (e.g., gamma rays, microwaves, electron beams, neutron beams) is absent at all stages of manufacturing. The term "external radiation" refers to man-made sources of radiation and excludes natural background radiation and/or sunlight. Most preferably, the polypropylene composition is not heated after melt extrusion to form the polypropylene composition. Thus, once the granules or pellets are isolated, there is no need to heat the granules or pellets to effect any other change to alter its properties (e.g., activating a cross-linking agent, etc.).

In any embodiment, the polypropylene resin and organic peroxide, and any other ingredients, additives, etc., are heated up to below the polymer's melting point temperature prior to or concurrently with blending together prior to the "combining" step of melt extrusion, preferably heated to between 50, or 60, or 70° C. to 100, or 120° C. Such blending can occur, for example, in the feed hopper of the extruder.

Also, in any embodiment the polypropylene composition comprises minimal side products from the process to form them, most preferably comprising decomposition products consisting of carbon dioxide and alcohol, especially alcohols having a lower molecular weight than the organic peroxide used to form the composition, preferably less than 3, or 2, or 1 wt % (or within a range from 0.1, or 0.5 wt % to 1, or 2, or 3 wt %) of C10 to C20 or C30 alcohols, most preferably alcohols selected from the group consisting of octyl, decyl, lauryl, myristyl, cetyl, arachidyl, behenyl, erucyl and ceryl alcohols, and combinations thereof.

The polypropylene composition may further comprise a foaming agent as is known in the art to effect the formation of air containing pockets or cells within the composition. In any embodiment is disclosed the reaction product of the foaming agent and polypropylene composition. This reaction product may be formed into any number of suitable foamed articles such as cups, plates, other food containing items, and food storage boxes, toys, handle grips, and other articles of manufacture.

The various descriptive elements and numerical ranges disclosed herein for the polypropylene composition and methods of forming such can be combined with other descriptive elements and numerical ranges to describe the invention(s); further, for a given element, any upper numerical limit can be combined with any lower numerical limit described herein, including the examples for jurisdictions that allow such combinations. The features of the inventions are demonstrated in the following non-limiting examples.

EXAMPLES

Molecular Weights and Melting Temperatures

Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS), and also a Multi-Angle Light Scattering detector (MALLS), where mono-dispersed polystyrene is the standard in all cases. The Mark-Houwink constants used were K=0.000229, and a=0.705. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. MALLS analysis is relied upon for Mw and Mz when calculating, for example, Mw/Mn, or Mz/Mn for the hyperbranched polypropylene, which is a more accurate method for measuring highly branched polymers, while DRI values are used for Mn, which is more sensitive and detects smaller molecules. For purposes of the claims and specification, SEC-DRI shall be used for all Mn, Mw, and Mz unless otherwise specified.

The branching index (g'vis, also referred to as g'$_{vis\ avg}$) is calculated using the output of the SEC-DRI-LS-VIS method described in WO 2014/070386 at paragraphs 30 to 35.

Sheer Thinning and Strain Hardening

A MCR501 Dynamic Stress/Strain Rheometer was used to measure sheer thinning of the polypropylene samples. A TA Instruments ARES-G2 mechanical spectrometer was used to measure strain hardening of the polypropylene samples. The polymer samples were prepared for measurements as follows: each polymer sample was heated to about 200° C. for 3 min to melt the sample without pressure. Then, 1500 psi pressure was applied while the sample was kept heated for another 3 min between two plates. Afterwards, the pressure applied to the sample was removed while the sample was kept heated at 200° C. for another 20 min. After 20 min, the sample was cooled with water circulation without any pressure applied for an additional 20 min. In the experiments described herein, all samples were annealed. The temperature can vary from 120° C. to 190° C. for extensional measurements but was set 190° C. for testing polymer samples herein. The Hencky strain rate was run at 0.01 s$^{-1}$, 0.1 s$^{-1}$ and 1.0 s$^{-1}$.

Melt Strength and Elongational Viscosity

The melt strength and elongational viscosity were measured using a Rheotester 1000 capillary rheometer in combination with the Rheotens 71.97 (Gottfert) as described in established test method RHEO4-3.3 ("Measurement of the elongational viscosity of molten polymers"). The conditions for testing melt strength and extensional viscosity using the Rheotens 71-97 in combination with the Rheotester 1000 are described in RHEO4-3.3 are as follows:

Rheotester 1000:
Temperature: 190° C.
Die: 30/2
Piston speed: 0.278 mm/s
Shear rate: 40.050 sec$^{-1}$
Strand:
Length: 100 mm
Vo: 10 mm/s
Rheotens:
Gap: 0.7 mm
Wheels: grooved
Acceleration: 12.0 mm/s$^2$ For each polymer sample, several measurements are performed. The complete amount of material present in the barrel of the Rheotester was extruded through the die and was picked up by the rolls of the Rheotens. Once the strand was placed between the rolls, the roll speed was adjusted until a force of "zero" was measured. This beginning speed "Vs" was the speed of the strand through the nip of the wheels at the start of the test. Once the test was started, the speed of the rolls was increased with a 12.0 mm/s$^2$ acceleration and the force was measured for each given speed. After each strand break, or strand slip between the rotors, the measurement was stopped and the polymer sample was placed back between the rolls for a new measurement. A new curve was recorded. Measuring continued until all sample in the barrel was used. After testing, all the obtained curves were saved. Curves which were out of line were deactivated. The remaining curves were cut at the same point at break or slip (maximum force measured), and were used for the calculation of a mean curve. The numerical data of the calculated mean curves are reported.

Melt Flow Characteristics

The melt index ($I_2$) and high melt flow index ($I_{21}$) were measured according to ASTM D1238 at 2.16 kg, and 21.6 kg, respectively, both at 190° C.

Experiments

Experiments were conducted to test the strain hardening, shear thinning and melt strength of PP resin melt blended at various temperatures and concentrations of organic peroxide. The starting polypropylene resin was a Ziegler-Natta produced homopolymer having an $I_2$ of 3.1 g/10 min, an $I_{21}$ of 352 g/10 min, a Mz/Mw (DRI) of 2.9, and a melt strength of 22.2 cN. Also, the starting polypropylene resin used in the examples have a Mw/Mn (MWD, by DRI) of 8.4, an Mn value of 41,300 g/mol, an Mw value of 347,400 g/mole, and an Mz value of 1,100,000 g/mole.

The organic peroxide, Perkadox 24L™ (dicetyl peroxydicarbonate, from Akzo-Nobel), was tumble blended with all other additives as well as the base granule at room temperature (25° C.). In the examples, different levels of Perkadox 24L, together with 2000 ppm of Irganox™ 1010, 2000 ppm of Irgafos™ 168 and 500 ppm of CaSt (acid scavenger), were added. All the samples were extruded in a ZSK 30 mm twin screw extruder from Werner Pfleiderer at the temperatures listed in Table 1. The listed temperatures are the set "temperatures" at the die portion of the extruder, or the temperature at which the equipment was set. The melt flow testing results are consistent with later rheology testing results, as summarized in Table 1.

Various amounts of organic peroxide were dry blended then melt extruded with the polypropylene resin at various temperatures. It was observed that Perkadox 24L can be effective when present in an amount as low as 0.3 wt %. In this instance, the I2 was lower than the control (without Perkadox 24L) sample, which indicates that the molecular weight of the polypropylene composition increases due to chain branching and/or cross-linking initiated by Perkadox 24L. And the higher the concentration of Perkadox, the lower the I2 value becomes (the data set for 1.3% Perkadox 24L extruded at 210° C. is believed to not follow the pattern because it had an issue with the stabilizing additives dosage amount).

Temperature also had an influence on the resulting polypropylene composition. At the same concentration of Perkadox 24L of 1.3%, the higher temperature 260° C. extrusion resulted in a composition with lower $I_2$ but the highest $I_{21}/I_2$ ratio, which suggested the highest Mw and strongest shear thinning over all. The melt index testing results are consistent with the rheology testing results. These data are summarized in Table 1.

TABLE 1

Melt Extrusion experiments at different temperatures and organic peroxide concentrations

| Organic peroxide (wt %) | Melt Temperature (° C.) | $I_2$ | $I_{21}$ | $I_{21}/I_2$ | Peak Extensional Viscosity (kPa-sec) at 0.01 s$^{-1}$ | melt strength (cN) | Draw Ratio |
|---|---|---|---|---|---|---|---|
| 0 | 210 | 3.1 | 352 | 112 | 25 | 22.2 | 3.6 |
| 0.3 | 210 | 2.1 | 304 | 148 | 485 | 20.7 | 4.4 |
| 0.5 | 210 | 2.3 | 296 | 131 | 885 | 22.7 | 4.5 |
| 1.3 | 210 | 3.4 | 380 | 112 | — | — | — |
| 2 | 210 | 1.2 | 191 | 158 | 2083 | 48.8 | 5.2 |
| 1.3 | 240 | 1.3 | 206 | 156 | 2000 | 50.8 | 5.6 |
| 1.3 | 260 | 0.9 | 147 | 158 | 2900 | 56.3 | 7.4 |

Figure 2:
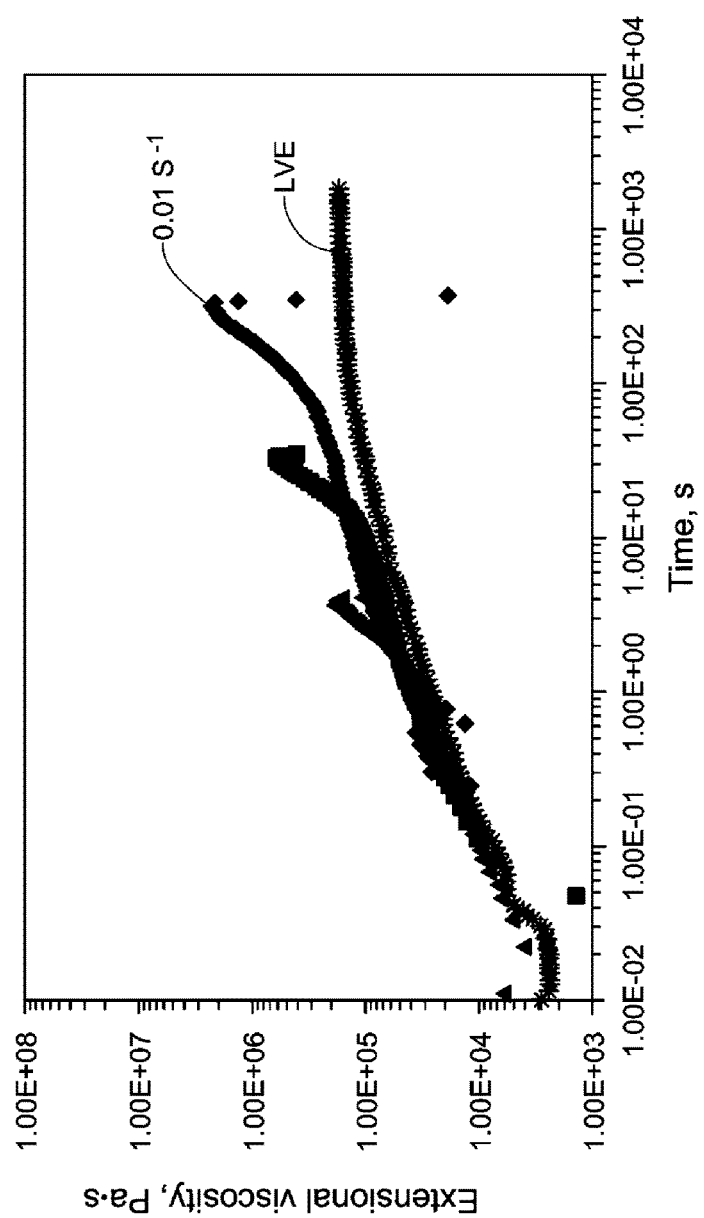
FIG. 2 is a graph of Extensional Viscosity data as a function of time for polypropylene resin reacted with an organic peroxide, as described below, at 240° C.
Figure 3:
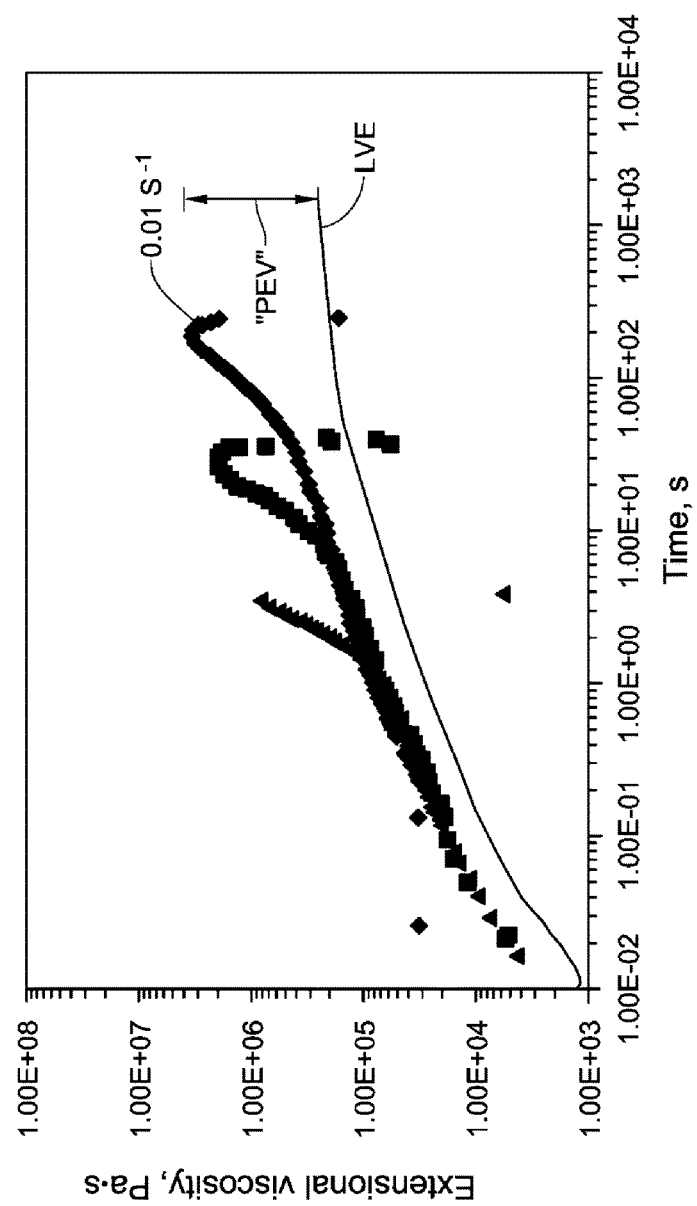
FIG. 3 is a graph of Extensional Viscosity data as a function of time for polypropylene resin reacted with an organic peroxide, as described below, at 260° C.

Rheology testing was performed on the polypropylene compositions to test strain hardening, shear thinning and melt strength effects. As shown in FIG. 1, FIG. 2 and FIG. 3, and Table 1, the highest extensional viscosity, which is correlated to the strain hardening effect reached the highest when the PP resin was extruded with 1.3% of Perkadox 24L at 260° C.

Figure 4:
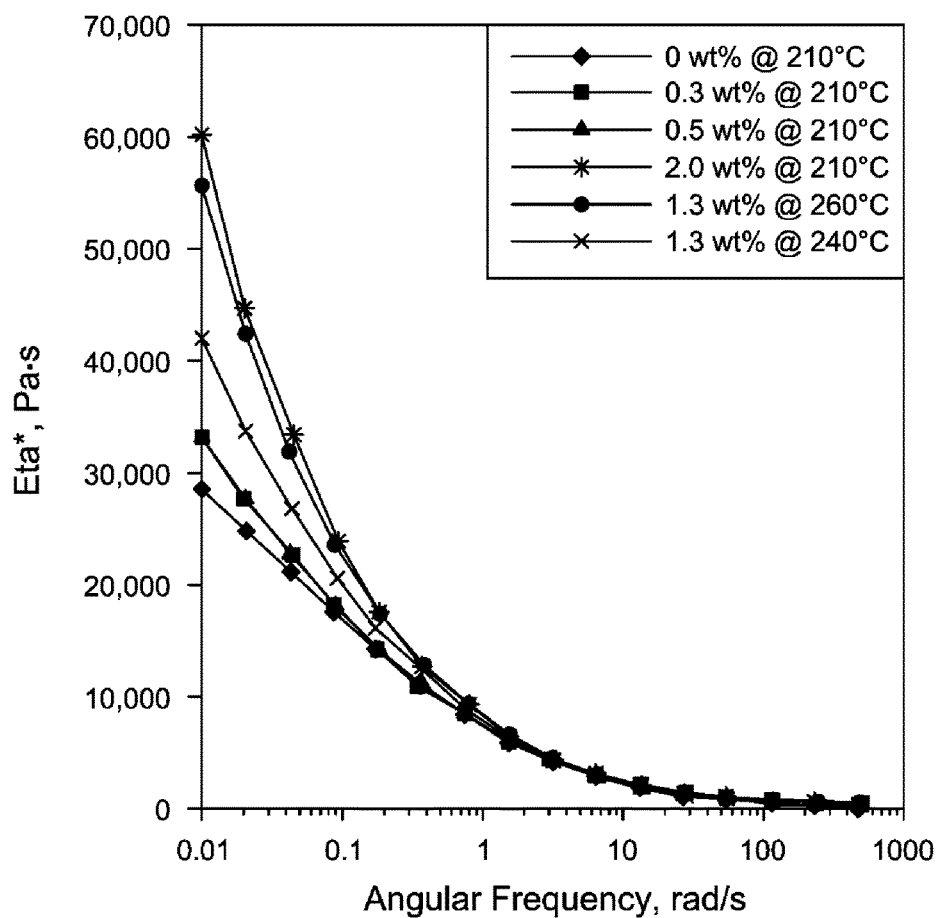
FIG. 4 is a graph of Sheer Viscosity as a function of Angular Frequency for various polypropylene resins and reaction products at various temperatures.

The viscosity curves, shown in FIG. 4 from rheology testing, are consistent with the $I_{21}/I_2$ observations. The polypropylene resin was extruded with 1.3% of Perkadox 24L at 260° C. also has the second steepest, as well as second highest Eta* curve which represents a high shear thinning effect.

The polypropylene resin extruded with 1.3% of Perkadox 24L at 260° C. also has the highest melt strength and a draw ratio, which is close to *Borealis*' WB140 resins, as shown in FIG. 5.

Having described the various aspects of the polypropylene composition and process of making it, described here in numbered paragraphs is:

P1. A polypropylene composition comprising at least 50 mol % propylene and having a PEV (annealed) of greater than 500 kPa·s at a strain rate of 0.01 sec$^{-1}$ (190° C.) and a melt strength of at least 40 determined using an extensional rheometer at 190° C.

P2. The polypropylene composition of numbered paragraph 1, the polypropylene composition having an $Mz_{MALLS}/Mw_{MALLS}$ value of greater than 3.0.

P3. The polypropylene composition of numbered paragraphs 1 or 2, the polypropylene composition having an MWD within the range from 10 to 20.

P4. The polypropylene composition of any one of the previous numbered paragraphs, the polypropylene composition having a branching index (g') of less than 0.97.

P5. The polypropylene composition of any one of the previous numbered paragraphs, the polypropylene composition having a draw ratio of greater than 5.0.

P6. The polypropylene composition of any one of the previous numbered paragraphs, the polypropylene composition having an $I_{21}/I_2$ value of greater than 150.

P7. A foamed article comprising the polypropylene composition of any one of the previous numbered paragraphs.

P8. A process to form the polypropylene composition of any one of the previous numbered paragraphs comprising (or consisting of, or consisting essentially of) or, alternatively, a method of increasing the $I_{21}/I_2$ in a polypropylene composition comprising:

combining at (preferably increasing) a temperature within a range from 190° C. to 320° C. a polypropylene resin and within the range from 0.01 wt % to 3 wt % of at least one organic peroxide by weight of the ingredients, and within a range from 100 to 4000 ppm each of phosphorous- and hindered phenol antioxidants, and isolating a polypropylene composition;

the polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and optionally wherein as the melt temperature increases from 190° C., the $I_{21}/I_2$ of the composition increases then levels off.

P9. A process to form a polypropylene composition of any one of the previous numbered paragraphs 1 to 7 comprising (or consisting of, or consisting essentially of), or, alternatively, a method of increasing the PEV in a polypropylene composition comprising:

combining at (preferably increasing) a temperature within a range from 190° C. to 320° C. a polypropylene resin and within the range from 0.01 wt % to 3 wt % of at least one organic peroxide by weight of the ingredients, and within a range from 100 to 4000 ppm each of phosphorous- and hindered phenol antioxidants, and isolating a polypropylene composition;

the polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.; and optionally wherein as the melt temperature of the polypropylene composition increases from 190° C. the PEV increases then levels off.

P10. A process to form a polypropylene composition of any one of the previous numbered paragraphs 1 to 7 comprising (or consisting of, or consisting essentially of), or, in the alternative, a method of increasing the melt strength of a polypropylene composition comprising:

combining at (preferably increasing) a temperature within a range from 190° C. to 320° C. a polypropylene resin and within the range from 0.01 wt % to 3 wt % of at least one organic peroxide by weight of the ingredients, and within a range from 100 to 4000 ppm each of phosphorous- and hindered phenol antioxidants, and isolating a polypropylene composition;

the polypropylene resin having a melt strength within the range from 10 to 40 cN, and the polypropylene composition having a melt strength within the range from greater than 40 to 100 cN, both as determined using an extensional rheometer at 190° C.

P11. The process of numbered paragraphs 8, 9 or 10, wherein the polypropylene resin has an MWD (Mw/Mn) within the range from 6 to 18.

P12. The process of any one of the previous numbered paragraphs 8 to 11, wherein the polypropylene resin has a melt strength within the range from 10 cN to 40 cN.

P13. The process of any one of the previous numbered paragraphs 8 to 12, wherein the polypropylene resin has a PEV (annealed) within a range from 15 kPa·s to 60 kPa·s at a strain rate of 0.01 sec$^{-1}$ (190° C.).

P14. The process of any one of the previous numbered paragraphs 8 to 13, wherein the polypropylene resin comprises at least 90 mol % propylene.

P15. The process of any one of the previous numbered paragraphs 8 to 14, wherein the polypropylene resin has an Mz/Mw value of less than 3.6.

P16. The process of any one of the previous numbered paragraphs 8 to 15, wherein the organic peroxide is selected from compounds having one or more structures selected from:

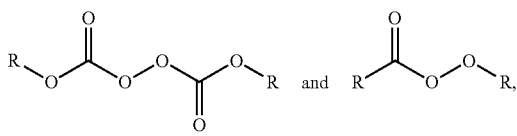

wherein each "R" group is independently selected from the group consisting of hydrogen, C1 to C30 linear alkyls, C1 to C30 secondary alkyls, C1 to C30 tertiary alkyls, C7 to C34 alkylaryls, C7 to C34 arylalkyls, and substituted versions thereof P17. The process of numbered paragraph 16, wherein each "R" group is independently selected from C8 to C24 linear, secondary, or tertiary alkyls.

P18. The process of any one of the previous numbered paragraphs 8 to 17, the polypropylene composition having a melt strength within the range from greater than 40 cN to 100 cN.

P19. The process of any one of the previous numbered paragraphs 8 to 18, the polypropylene composition having an $I_{21}/I_2$ value of greater than 150.

P20. The process of any one of the previous numbered paragraphs 8 to 19, wherein as the melt temperature of the polypropylene composition increases from 190° C. the PEV increases.

P21. The process of any one of the previous numbered paragraphs 8 to 20, wherein as the level of organic peroxide increases, the I2 and I21 values of the polypropylene composition decrease and the $I_{21}/I_2$ value of the polypropylene composition increases.

P22. The process of any one of the previous numbered paragraphs 8 to 21, wherein as the level of organic peroxide increases above 1.5 wt % the $I_{21}/I_2$ value of the polypropylene composition becomes constant or goes down.

P23. The process of any one of the previous numbered paragraphs 8 to 22, wherein a step of exposing the composition to external radiation is absent at all stages of manufacturing.

P24. The process of any one of the previous numbered paragraphs 8 to 23, comprising decomposition products consisting of carbon dioxide and alcohol.

P25. The process of any one of the previous numbered paragraphs 8 to 24, further comprising a foaming agent.

P26. A foamed article comprising the reaction product of the foaming agent and polypropylene composition of any one of the previous numbered paragraphs.

P27. The foamed article of numbered paragraph 26, the article selected from the group of cups, plates, and food storage boxes.

Also disclosed is the use of a polypropylene resin as described herein in a process to combine with an organic peroxide as described herein to form a polypropylene composition, preferably having the improved properties as described herein.

Also disclosed is the use of a polypropylene composition made as described in any one of the previous numbered paragraphs in an article, foamed or non-foamed.

The phrase "consisting essentially of" in a polymer composition or components in a process means that no other additives, monomers, and/or catalysts are present in the composition or process being referred to other than those named, or, if present, are present to a level no greater than 0.5, or 1.0, or 2.0, or 4.0 wt % by weight of the composition; in a polymer, the phrase "consisting essentially of" means that only the named monomer-derived units are present, and if any others are present, they are present to a level no greater than 0.5, or 0.2 wt % by weight of the polymer; and also in a process, "process . . . consisting essentially of" means that no other major process step is present that effects the formation of covalent chemical bonds between two or more moieties, for example, exposure to external radiation, addition of reactive cross-linking agents, another polymerization step, etc., but minor process features and changes that effect the rate of covalent bond formation as is claimed may be present, such as, for example, a change in temperature or pressure or concentration of components.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process to form a polypropylene composition comprising:

combining at a temperature within a range from 190° C. to 320° C. a polypropylene resin and within the range from 0.01 wt % to 3 wt % of at least one organic peroxide by weight of the ingredients, and within a range from 100 to 4000 ppm each of phosphorous- and hindered phenol antioxidants, and isolating a polypropylene composition;

the polypropylene resin comprising at least 50 mol % propylene, and having a molecular weight distribution (Mw/Mn) greater than 6, an Mz/Mw value of less than 3.6, a branching index (g') of at least 0.97, and a melt strength greater than 10 cN determined using an extensional rheometer at 190° C.

2. The process of claim 1, wherein the polypropylene resin has an MWD (Mw/Mn) within the range from 6 to 18.

3. The process of claim 1, wherein the polypropylene resin has a melt strength within the range from 10 cN to 40 cN.

4. The process of claim 1, wherein the polypropylene resin has a peak extensional viscosity, annealed, within a range from 15 kPa·s to 60 kPa·s at a strain rate of 0.01 sec$^{-1}$ at 190° C.

5. The process of claim 1, wherein the polypropylene resin comprises at least 90 mol % propylene.

6. The process of claim 1, wherein the organic peroxide is selected from compounds having one or more structures selected from:

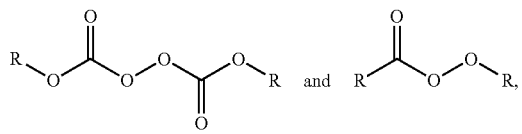

wherein each "R" group is independently selected from the group consisting of hydrogen, C1 to C30 linear alkyls, C1 to C30 secondary alkyls, C1 to C30 tertiary alkyls, C7 to C34 alkylaryls, C7 to C34 arylalkyls, and substituted versions thereof.

7. The process of claim 6, wherein each "R" group is independently selected from C8 to C24 linear, secondary, or tertiary alkyls.

8. The process of claim 1, the polypropylene composition having an Mz$_{MALLS}$/Mw$_{MALLS}$ value of greater than 3.0.

9. The process of claim 1, the polypropylene composition having an MWD within the range from 10 to 20.

10. The process of claim 1, the polypropylene composition having a branching index (g') of less than 0.97.

11. The process of claim 1, the polypropylene composition having a melt strength within the range from greater than 40 cN to 80 cN.

12. The process of claim 1, the polypropylene composition having a draw ratio of greater than 5.0.

13. The process of claim 1, the polypropylene composition having a peak extensional viscosity, annealed, of greater than 500 kPa·s at a strain rate of 0.01 sec$^{-1}$ at 190° C.

14. The process of claim 1, the polypropylene composition having an I21/I2 value of greater than 150.

15. The process of claim 1, wherein a step of exposing the composition to external radiation is absent at all stages of manufacturing.

16. The process of claim 1, comprising decomposition products consisting of carbon dioxide and alcohol.

17. The process of claim 1, further comprising addition of a foaming agent either while combining the other ingredients or after isolating the polypropylene composition.

18. A process to form a polypropylene composition comprising:

combining at a temperature within a range from 190° C. to 320° C. a polypropylene resin and within the range from 0.01 wt % to 3 wt % of at least one organic peroxide by weight of the ingredients, and within a range from 100 to 4000 ppm each of phosphorous- and hindered phenol antioxidants, and isolating a polypropylene composition;

the polypropylene resin having a melt strength within the range from 10 to 40 cN, and the polypropylene composition having a melt strength within the range from greater than 40 to 100 cN, both as determined using an extensional rheometer at 190° C.;

the polypropylene composition having an MWD within the range from 10 to 20.

19. A process to form a polypropylene composition having an MWD within the range from 10 to 20 comprising:

combining at a temperature within a range from 190° C. to 320° C. a polypropylene resin and within the range from 0.01 wt % to 3 wt % of at least one organic peroxide by weight of the ingredients, and within a range from 100 to 4000 ppm each of phosphorous- and hindered phenol antioxidants, and isolating a polypropylene composition;

the polypropylene resin comprising at least 50 mol % propylene, and having a molecular weight distribution (Mw/Mn) greater than 6, a branching index (g') of at least 0.97, and a melt strength greater than 10 cN determined using an extensional rheometer at 190° C.

20. The process of claim 19, wherein the polypropylene resin has an MWD (Mw/Mn) within the range from 6 to 18.

21. The process of claim 19, wherein the polypropylene resin has a melt strength within the range from 10 cN to 40 cN.

22. The process of claim 19, the polypropylene composition having an Mz$_{MALLS}$/Mw$_{MALLS}$ value of greater than 3.0.

23. The process of claim 19, the polypropylene composition having a branching index (g') of less than 0.97.

24. The process of claim 19, the polypropylene composition having a melt strength within the range from greater than 40 cN to 80 cN.

25. The process of claim 19, further comprising addition of a foaming agent either while combining the other ingredients or after isolating the polypropylene composition.

* * * * *